United States Patent [19]

Abeler

[11] 4,352,903
[45] Oct. 5, 1982

[54] CHLORINATED THERMOPLASTICS STABILIZED WITH AMINOTHIOURACILS

[75] Inventor: Gerd Abeler, Darmstadt, Fed. Rep. of Germany

[73] Assignee: Ciba-Geigy Corporation, Ardsley, N.Y.

[21] Appl. No.: 268,558

[22] Filed: Jun. 1, 1981

[30] Foreign Application Priority Data

Jun. 2, 1980 [CH] Switzerland ............... 4261/80

[51] Int. Cl.$^3$ .............................. C08K 5/34
[52] U.S. Cl. ..................... 524/100; 524/109; 524/114; 524/180; 524/399; 524/400
[58] Field of Search .............. 260/45.8 NH; 524/100

[56] References Cited

U.S. PATENT DOCUMENTS 2,615,020 10/1952 Papesch et al. ............ 544/312
3,436,362 4/1969 Hayer et al. ............... 260/23.1
4,105,627 8/1978 Sekiguchi et al. ......... 260/45.8 NH

FOREIGN PATENT DOCUMENTS 888167 7/1953 Fed. Rep. of Germany .

Primary Examiner—John Kight, III
Assistant Examiner—R. A. White
Attorney, Agent, or Firm—Harry Falber

[57] ABSTRACT

The invention relates to thermoplastic moulding compositions based on polymers of vinyl chloride and containing 0.1 to 5% by weight of a 2-thio-6-aminouracil of the formula I

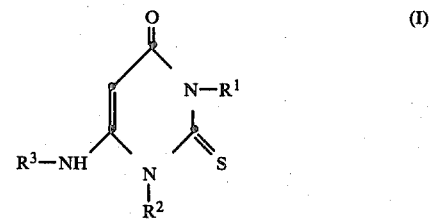

wherein each of $R^1$ and $R^2$ independently is a hydrocarbon radical of 1 to 24 carbon atoms which can be substituted by —OH, —COOR$^4$, —O(C=O)R$^4$, —(C=O)R$^4$, halogen or amino, and $R^3$ is hydrogen, acyl of 2 to 24 carbon atoms or —(C=O)NHR$^4$, while $R^4$ is a hydrocarbon radical of 1 to 24 carbon atoms.

6 Claims, No Drawings

CHLORINATED THERMOPLASTICS STABILIZED WITH AMINOTHIOURACILS

The present invention relates to novel stabilised chlorinated thermoplastics and to the use of specific uracils for stabilising such substrates.

Uracils are known as stabilisers for PVC from German Auslegeschrift 1 694 873, e.g. 1,3-dimethyl-6-aminouracil (column 2, lines 2/3). A thiouracil, namely 3-phenyl-6-methyl-2-thiouracil, is also known as a stabiliser for PVC from U.S. Pat. No. 4,105,627 (column 7, line 26). Finally, German Pat. No. 888 167 discloses pyrimidines as stabilisers for PVC, e.g. 2,4-diamino-6-oxy-pyrimidine.

It has been found, however, that these known stabilisers do not always satisfy the exacting demands of actual practice. Their effectiveness, their compatibility with the substrate, and also their stability to heat and hydrolysis, are insufficient. Finally, they are also unsatisfactory from the toxicological point of view.

It is the object of this invention to provide stabilisers which do not have these drawbacks or which have them to a far lesser degree.

Accordingly, the present invention provides thermoplastic moulding compositions based on polymers of vinyl chloride, said compositions containing 0.1 to 5% by weight of a 2-thio-6-aminouracil of the formula I

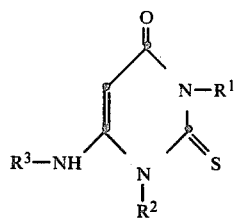

wherein each of $R^1$ and $R^2$ independently is a hydrocarbon radical of 1 to 24 carbon atoms which can be substituted by —OH, —COOR$^4$, —O(C=O)R$^4$, —(C=O)R$^4$, halogen or amino, and $R^3$ is hydrogen, acyl of 2 to 24 carbon atoms or —(C=O)NHR$^4$, whilst $R^4$ is a hydrocarbon radical of 1 to 24 carbon atoms.

A hydrocarbon radical $R^1$ and/or $R^2$ containing 1 to 24 carbon atoms which can be substituted by —OH, —COOR$^4$, —O(C=O)R$^4$, —(C=O)R$^4$, halogen or amino is e.g. $C_1$–$C_{24}$alkyl such as branched or, preferably, straight-chain alkyl, in particular $C_1$–$C_{12}$alkyl such as methyl, ethyl, n-propyl, n-butyl or n-octyl; or also $C_2$–$C_{24}$alkenyl, in particular $C_2$–$C_{12}$alkenyl such as vinyl or propen-1-yl; or also $C_6$–$C_{24}$aryl such as phenyl or ($C_1$–$C_{12}$alkyl)phenyl such as methylphenyl, dimethylphenyl, ethylphenyl or isopropylphenyl; or also $C_7$–$C_{24}$aralkyl such as benzyl, α,α-dimethylbenzyl or methylbenzyl, e.g. 4-methylbenzyl; or also $C_1$–$C_{24}$hydroxyalkyl, in particular $C_2$–$C_{12}$hydroxyalkyl such as 2-hydroxyethyl; or also esterified $C_2$–$C_{24}$carboxyalkyl such as $C_3$–$C_{24}$alkoxycarbonylmethyl, e.g. methoxycarbonylmethyl, n-butoxycarbonylmethyl, n-octoxycarbonylmethyl or n-$C_{14}H_{29}$oxycarbonylmethyl, or also $C_2$–$C_{24}$acyloxyalkyl, wherein alkyl is preferably methylene or 1,2-ethylene, such as ($C_1$–$C_{12}$alkyl)carbonyloxymethyl or 2-[($C_1$–$C_{12}$alkyl)carbonyloxy]ethyl, e.g. acetyloxymethyl 2-acetyloxyethyl, propionyloxymethyl or 2-propionyloxyethyl; or also $C_3$–$C_{24}$acylalkyl, wherein alkyl is preferably methylene, such as ($C_1$–$C_{12}$alkyl)carbonylmethyl, e.g. acetylmethyl or propionylmethyl; or also $C_1$–$C_{24}$haloalkyl, wherein halogen is preferably chlorine, such as 2-chloroethyl or 2-chloropropyl; or also $C_6$–$C_{24}$halophenyl such as chlorophenyl; or also $C_6$–$C_{24}$aminophenyl such as aminophenyl itself.

$R^3$ as acyl of 2 to 24 carbon atoms is e.g. $C_2$–$C_{24}$alkylcarbonyl, in particular $C_2$–$C_{18}$alkylcarbonyl such as acetyl, propionyl, butyryl, n-undecylcarbonyl or n-heptadecylcarbonyl, or acetoacetyl. $R^3$ as —(C=O)NHR$^4$, wherein $R^4$ is a hydrocarbon radical of 1 to 24 carbon atoms, is e.g. ($C_1$–$C_{12}$alkyl)aminocarbonyl such as methylaminocarbonyl, ethylaminocarbonyl or n-propylaminocarbonyl.

In the practice of this invention it is preferred to use those uracils of the formula I, wherein $R^1$ and $R^2$ have the given meanings and $R^3$ is hydrogen. It is most preferred to use those uracils of the formula I, wherein $R^1$ and $R^2$ are $C_1$–$C_{12}$alkyl and $R^3$ is hydrogen, especially those compounds specified in the Examples.

The uracils employed in the practice of this invention are known and can be obtained by known methods, e.g. as described in U.S. Pat. No. 2,598,936. Those compounds which are novel can be prepared by methods analogous to known ones, e.g. as described in the above U.S. patent.

The uracils employed in the practice of this invention are most suitable for protecting chlorinated thermoplastics against heat-induced degradation. They can be incorporated in the thermoplastics to be stabilised singly or in admixture with one another, before processing in conventional apparatus, and in respective amounts of 0.1 to 5% by weight, preferably 0.2 to 1.5% by weight, based on the entire composition.

Examples of chlorinated thermoplastics are polyvinylidene chloride and, preferably, polymers of or based on vinyl chloride. Suspension and mass polymers, and emulsion polymers having a low content of emulsifier, are preferred. Polyvinyl chloride can be plasticised or rigid PVC. Processing by injection moulding, calendering and extruding is particularly preferred, as is also the production of plastisols.

Examples of comonomers for thermoplastics based on vinyl chloride are: vinylidene chloride, trans-dichloroethane, ethylene, propylene, butylene, maleic acid, acrylic acid, fumeric acid or itaconic acid.

Depending on the end use, further additives can be incorporated in the moulding compound before, during or after the addition of the stabiliser or stabiliser mixture. Examples of further additives together with which the stabilisers of the invention can be used, are: antioxidants such as 2,6-dialkylphenols, derivatives of alkylated hydroquinones, hydroxylated thiodiphenyl ethers, alkylidene bisphenols, O-, N- and S-benzyl compounds, hydroxybenzylated malonates, hydroxybenzyl aromatics, s-triazine compounds, amides of β-(3,5-di-tert-butyl-4-hydroxyphenyl)-propionic acid, esters of β-(3,5-di-tert-butyl-4-hydroxyphenyl)-propionic acid, esters of β-(5-tert-butyl-4-hydroxy-3-methylphenyl)-propionic acid, esters of β-(5-tert-butyl-4-hydroxyphenyl)-acetic acid, acylaminophenols, benzylphosphonates, aminoaryl derivatives, UV absorbers and light stabilisers such as 2-(2'-hydroxyphenyl)-benztriazoles, 2,4-bis-(2'-hydroxyphenyl)-6-alkyl-s-triazines, 2-hydroxybenzophenones, 1,3-bis-2-(2'-hydroxybenzoyl)-benzenes, esters of substituted or unsubstituted benzoic acids, acrylates, nickel compounds, sterically hindered amines, oxalic acid diamides, metal deactivators, phosphites, compounds which decompose peroxide, polyamide stabilizers, basic co-stabilisers, nucleination agents or other additives, for example plasticisers, lubricants, emulsifiers, fillers, carbon black, asbestos, kaolin, talc, glass fibres, pigments, fluorescent whitening agents, flame retardants, antistatic agents.

Examples of further additives together with which the stabilisers of the present invention can be used are listed on pages 18–24 of German Offenlegungsschrift 2 427 853.

Preferred co-stabilisers are calcium/zinc carboxylates, organo-tin stabilisers and epoxides.

The invention is illustrated in more detail by the following Examples, in which parts and percentages are by weight.

EXAMPLE 1:

A dry blend consisting of 100 parts of S-PVC (K value 64), 20 parts of dioctyl phthalate, 3 parts of epoxidised soybean oil (REOPLAST 39 ®), 0.5 part of phenyldidecylphosphite (IRGASTAB CH 300 ®) and 1.5 parts of 1,3-di-n-butyl-2-thio-6-aminouracil (compound 1) is rolled for 5 minutes on a mixer roll at 170° C. and then samples having a thickness of 0.3 mm are taken from the sheet obtained. These samples are subjected to heat in a test oven at 180° C. and every 5 minutes the thermal ageing of a sample is determined according to the Yellowness Index of ASTM D 1925/70. The results are reported in Table 1.

The procedure is repeated using a different dry blend consisting of 100 parts of S-PVC (K value 64), 2 parts of epoxidised soybean oil (REOPLAST 39 ®), 0.5 part of trinonylphenylphosphite, 1 part of calcium/zinc stearate and 0.8 part of compound 1. The results are reported in Table 2.

Comparable results are obtained by replacing 1,3-di-n-butyl-2-thio-6-aminouracil with one of the following compounds:

1,3-dimethyl-2-thio-6-aminouracil
1,3-diethyl-2-thio-6-aminouracil
1,3-di-n-octyl-2-thio-6-aminouracil or
1-methyl-3-n-butyl-2-thio-6-aminouracil.

TABLE 1

Heat test: static/dynamic, mixer roll temperature 170° C., rolling time 5 min, oven temperature 180° C., thickness of sheet 0.3 mm Basic formulation: S-PVC (K value 64) 100 parts, dioctyl phthalate 20 parts, epoxidised soybean oil 3 parts, phenyldidecylphosphite 0.5 part

| Test No. | Test Compounds | Amount pph | Yellowing (YI of ASTM D 1925–70) and ageing (min) | | | | | |
|---|---|---|---|---|---|---|---|---|
| | | | 0 | 15 | 30 | 45 | 60 | 75 |
| 1 | — | — | 10 | 83 | >100 | | | |
| 2 | Compound 1 | 1.5 | 3 | 5 | 10 | 25 | 40 | 51 |

TABLE 2

Heat test: static/dynamic, mixer roll temperature 170° C., rolling time 5 min, oven temperature 180° C., thickness of sheet 0.3 mm Basic formulation: S-PVC (K value 64) 100 parts, epoxidised soybean oil 2 parts, trinonylphenylphosphite 0.5 part, Ca/Zn stearate 1 part

| Test No. | Test Compounds | Amount pph | Yellowing (YI n. ASTM D 1925–70) and ageing (min) | | | |
|---|---|---|---|---|---|---|
| | | | 0 | 15 | 30 | 45 |
| 1 | — | — | 44 | 86 | >100 | |
| 2 | Compound 1 | 0.8 | 3 | 7 | 33 | >100 |

What is claimed is:

1. A thermoplastic moulding composition based on a polymer of vinyl chloride, said composition containing 0.1 to 5% by weight of a 2-thio-6-aminouracil of the formula I

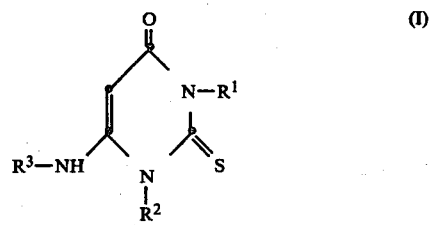

wherein each of $R^1$ and $R^2$ independently is a hydrocarbon radical of 1 to 24 carbon atoms which can be substituted by —OH, —COOR$^4$, —O(C=O)R$^4$, —(C=O)R$^4$, halogen or amino, and $R^3$ is hydrogen, acyl of 2 to 24 carbon atoms or —(C=O)NHR$^4$, whilst $R^4$ is a hydrocarbon radical of 1 to 24 carbon atoms.

2. A moulding composition according to claim 1, wherein $R^1$ and $R^2$ are as defined in claim 1 and $R^3$ is hydrogen.

3. A moulding composition according to claim 1, wherein $R^1$ and $R^2$ are $C_1$–$C_{12}$ alkyl and $R^3$ is hydrogen.

4. A moulding composition according to claim 1, which contains 1,3-di-n-butyl-2-thio-6-aminouracil.

5. A stabilized moulding composition according to claim 1, which contains an additional stabilizer selected from the group consisting of calcium/zinc carboxylate, organo-tin compounds and epoxides.

6. A method of stabilizing chlorinated thermoplastic polymers which comprises incorporating therein an effective stabilizing amount of a uracil according to claim 1.

* * * * *